United States Patent
Siegel

(10) Patent No.: US 8,804,698 B2
(45) Date of Patent: Aug. 12, 2014

(54) METHOD AND SYSTEM FOR FIND ME/ FOLLOW ME IN IMS THROUGH EDITING OF IMS REGISTRATIONS AT S-CSCF

(75) Inventor: Steven A. Siegel, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 449 days.

(21) Appl. No.: 12/725,000

(22) Filed: Mar. 16, 2010

(65) Prior Publication Data

US 2011/0228760 A1 Sep. 22, 2011

(51) Int. Cl.
*H04L 12/66* (2006.01)
*H04M 3/42* (2006.01)

(52) U.S. Cl.
USPC ..................................... 370/352; 379/211.03

(58) Field of Classification Search
CPC ............ H04L 65/1016; H04L 65/1006; H04L 65/1069; H04L 65/105; H04L 63/08
USPC ............................... 370/352–356; 379/211.03
See application file for complete search history.

(56) References Cited

U.S. PATENT DOCUMENTS

| 5,473,681 | A | 12/1995 | Partridge, III |
| 6,263,064 | B1 | 7/2001 | O'Neal et al. |
| 6,625,258 | B1 | 9/2003 | Ram et al. |
| 6,683,870 | B1 | 1/2004 | Archer |
| 6,779,030 | B1 | 8/2004 | Dugan et al. |
| 2005/0060411 | A1* | 3/2005 | Coulombe et al. ............. 709/227 |
| 2006/0252444 | A1* | 11/2006 | Ozugur ......................... 455/519 |
| 2007/0206566 | A1 | 9/2007 | Bennett ......................... 370/352 |
| 2008/0070556 | A1* | 3/2008 | Bhattacharjee et al. ... 455/414.1 |
| 2010/0306397 | A1* | 12/2010 | Belinch n Vergara et al. ............................ 709/230 |
| 2011/0177797 | A1* | 7/2011 | Vendrow et al. ............ 455/414.1 |

FOREIGN PATENT DOCUMENTS

WO   WO 2009/068113   *   6/2009

* cited by examiner

*Primary Examiner* — Asad Nawaz
*Assistant Examiner* — Joel Hamel
(74) *Attorney, Agent, or Firm* — Wolff & Samson, PC

(57) ABSTRACT

A method for operation of a Serving Call Session Control Function (S-CSCF) server is provided. The method includes storing a plurality of records, each record corresponding to a respective one of a plurality of Internet Protocol Multimedia Services (IMS) terminals associated with a user, the plurality of records indicating an order of the IMS terminals for attempting to establishing a communication link with the user. The method also includes receiving an input from an application server indicating a request to change at least one of the records to indicate a different order, and changing the record. A system for operation of a Serving Call Session Control Function (S-CSCF) server, and a computer-readable medium having stored thereon computer-executable instructions, the computer-executable instructions causing a processor to perform a method for operation of a Serving Call Session Control Function (S-CSCF) server when executed, are provided.

12 Claims, 5 Drawing Sheets

300

| | 310 | 320 | 330 | 340 | 350 | 360 |
|---|---|---|---|---|---|---|
| | PUID | P-CSCF | CONTACT | CAPABILITIES | Q VALUE | (DEVICE) |
| | PUID-1 | P-CSCF-A | CELL PHONE | AUDIO; VIDEO | 1 | (CELL PHONE) |
| | PUID-1 | P-CSCF-B | LAB PHONE | AUDIO | 2 | (HOME PHONE) |
| | PUID-1 | P-CSCF-B | OFFICE PHONE | AUDIO | 3 | (OFFICE PHONE) |

METHOD AND SYSTEM FOR FIND ME/ FOLLOW ME IN IMS THROUGH EDITING OF IMS REGISTRATIONS AT S-CSCF

FIELD OF THE INVENTION

The present application relates to VoIP, voice applications and advanced voice features, and in particular relates to a system for a user to manage an order of Internet Protocol Multimedia Subsystem (IMS) terminals for attempting to establishing a communication link with a user.

BACKGROUND OF THE INVENTION

Find Me/Follow Me refers to two technologies that, in conjunction, enable incoming phone calls to be received at different locations, on different phones. "Find Me" refers to the ability to receive incoming calls at any location. "Follow Me" refers to the ability to receive calls at any number of designated phones, whether ringing all at once, or in sequence.

An Internet Protocol Multimedia Subsystem (IMS) is an architectural framework for delivering Internet Protocol (IP) multimedia services. The IMS defined by Third Generation Partnership Projects (3GPP and 3GPP2) is a technology designed to provide multimedia services across roaming boundaries and over diverse access technologies. An IMS terminal may be a computer, a netbook, a smart phone, a PDA, or any other appropriate device, The Session Initiation Protocol (SIP) is a signaling protocol, widely used for controlling multimedia communication sessions such as voice and video calls. A Proxy Call Session Control Function (P-CSCF) is a SIP proxy that is the first point of contact for an IMS terminal. It can be located either in a visited network (in full IMS networks) or in a home network (when the visited network is not IMS compliant yet).

A Serving Call Session Control Function (S-CSCF) is a central node of a signaling plane. It is a SIP server that performs session control. It is located in the home network.

SUMMARY OF THE INVENTION

An exemplary embodiment enables a Customer Portal through which an IMS Customer can choose the order in which different devices, on which the customer's Public User IDs are registered, are tried for IMS INVITES, or for other initial SIP messages requiring a response. Attempts may be limited to those devices which have a particular desired capability (e.g. video). The user may manage different orders for different Public User Identities assigned to the customer, and may specify when simultaneous attempts should be made.

A method for operation of a Serving Call Session Control Function (S-CSCF) server is provided. The method includes storing a plurality of records, each record corresponding to a respective one of a plurality of Internet Protocol Multimedia Services (IMS) terminals associated with a user, the plurality of records indicating an order of the IMS terminals for attempting to establishing a communication link with the user. The method also includes receiving an input from an application server indicating a request to change at least one of the records to indicate a different order, and changing the record.

A system for operation of a Serving Call Session Control Function (S-CSCF) server is provided. A computer-readable medium having stored thereon computer-executable instructions, in which the computer-executable instructions cause a processor to perform a method for operation of a Serving Call Session Control Function (S-CSCF) server when executed, is provided.

These and other advantages of the invention will be apparent to those of ordinary skill in the art by reference to the following detailed description and the accompanying drawings.

DETAIL DESCRIPTION

IMS registrations must be made from the device on which the Public User Identity (PUID, which may be a telephone number) is being registered. This makes centralized management of an order of attempts for establishing a communication link impossible. Standards allow order to be controlled by a q value tied to the registration and also support a capabilities field. By standard methods, one has to return to each device to change its q value or capabilities.

When a user registers a device in IMS, several parameters used in routing a call are set in the SIP Registrar, which is part of the S-CSCF. The three most important parameters for routing are the path to the user (based on the path used for registration), the capabilities (e.g. voice or video) and the priority (labeled a q value). A Public User Identity (PUID or IMPU) is the identity that is registered. A contact address for a user agent on the device and the P-CSCF used to access it are based on the record route headers of the REGISTER Message. The q value indicates the order in which various registrations are tried by the S-CSCF. For q values, higher values are tried first, before lower values. If the S-CSCF is unsuccessful in setting up a session (e.g. no answer), the next highest q value is tried. If multiple registrations have the same q value, then the multiple devices are tried simultaneously. A session is set up with whichever device answers first. If there is no specified q value in the REGISTER message, a default value of 1 is assigned.

A user may want to make changes in the order that devices are attempted for incoming sessions. For example, the user may have an office phone, a cell phone and a home phone. The user may normally want attempts to be made first to the office phone, then the home phone, then the cell phone. If the user is waiting for a call and doing work in another part of the house, the user may want the cell phone and the home phone to ring simultaneously. Changes can be made to the SIP Registrar for a particular device at which the PUID is registered by the user sending a REGISTER message from that particular device.

Figure 1:
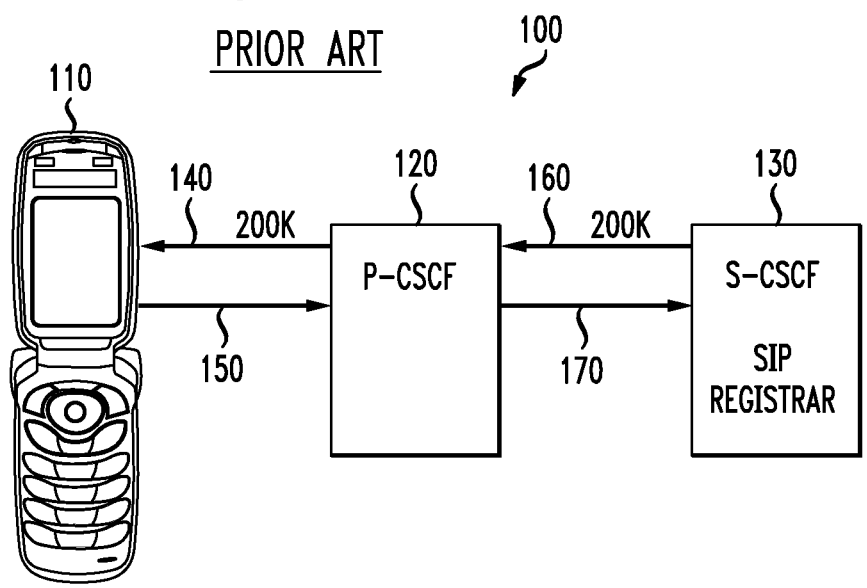
FIG. 1 illustrates an exemplary prior art system.

FIG. 1 shows a simplified view of the prior art registration. S-CSCF 130 gets the user's credentials from an HSS (Home Subscriber Server) and sends a challenge to a user using cell phone 110 via P-CSCF 120. The response would include authentication information sent from cell phone 110 by message 150 to P-CSCF 120 and from P-CSCF 120 by message 170 to S-CSCF 130. In this manner, the authentication information would be put into the SIP Registrar. If the authentication is successful, the S-CSCF updates the SIP Registrar, informs the HSS that the user is now registered, and responds with 200 OK message 160 to P-CSCF 120, and from P-CSCF 120 by 200K message 140 to cell phone 110. The only ways that the SIP Registrar may be changed based on current 3GPP specifications are by 1) sending the REGISTER message from the device at which the registration is being made or 2) through an automatic de-registration by the network. An automatic de-registration by the network usually occurs when the Time-To-Live set by the REGISTER message has expired.

In order for the user to make the changes described above, at least two of the q values would have to be changed. For example, if the q value for cell phone 110 was changed to 2 and the q value of the office phone was changed to 1, the desired order would be achieved. This would mean that the user would have to make changes from two devices. The fact that each device is set separately would make it more difficult for the user to achieve their objective.

The present system allows new registrations for IMS devices to be made from a centralized server. The new registration approach involves various network equipment, for example including the UA (User Agent), P-CSCF, I-CSCF (Interrogating CSCF), HSS and S-CSCF.

A customer is able to view all of the current registrations for any of the PUIDs belonging to the customer from a customer portal. The customer may be restricted from viewing the current registrations until after an authentication procedure has been performed. The ability to see current registrations may be enabled by having the portal subscribe to a REG event or through a third party registration. The REG event, when subscribed to by a SIP Application Server (SIP AS), has the S-CSCF send a set of registration information to the server when the S-CSCF does a registration. This is initiated by a SUBSCRIBE message from the SIP AS to the S-CSCF. A Third Party Registration is done by initial Filter Criteria in the Service Profile that includes the PUID that is being registered. A copy of the REGISTER Message is sent to the Application Server designated in the initial Filter Criteria when there is a successful registration.

Q values may be used to show the current order of attempts, and capabilities may be shown in order to indicate when attempts would or would not be made. By changing the order of attempts or the capabilities of any registration, the authenticated and authorized customer will be able to request a change to the registrations. The customer portal enables editing of the q values and capabilities of the registration on the S-CSCF.

This solution makes it easy for the customer to change the way the network contacts him/her. The customer can easily change the order of attempts (e.g. cell, office, lab, home, laptop) and can change which devices would be used for which capabilities (e.g. which devices to attempt to establish a link for video calls).

Figure 2:
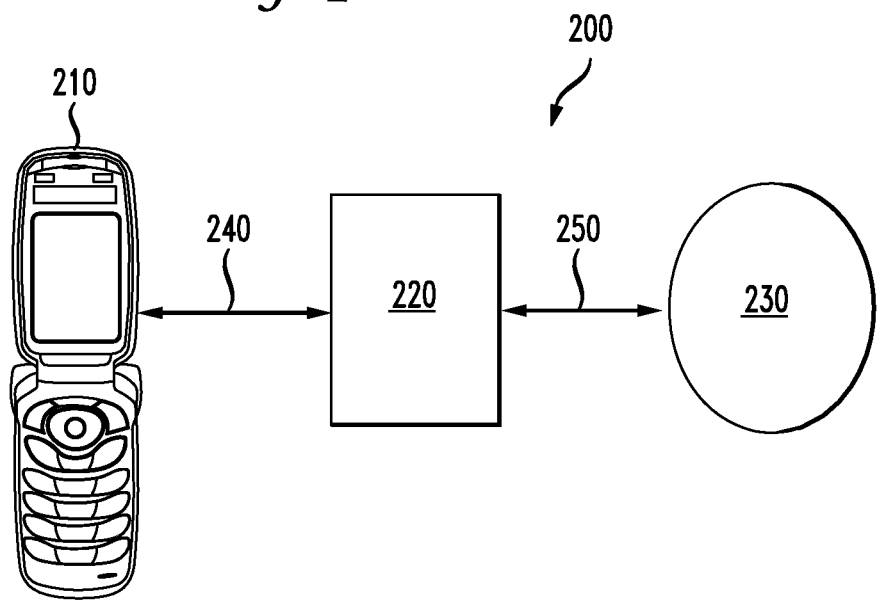
FIG. 2 illustrates a system according to an exemplary embodiment.

FIG. 2 illustrates a system according to an exemplary embodiment. System 200 includes cell phone 210, which may alternatively be any other SIP device. System 200 also includes application server 220 and S-CSCF 230 including a SIP Registrar. Cell phone 210 communicates messages 240 with application server 220. Application server 220 communicates with S-CSCF 230 by messages 250. In system 200, a user may access application server 220 from any computer, PDA or any other appropriate internet-enabled device, including cell phone 210. Application server 220 may authenticate the user of cell phone 210 by any appropriate method.

After authentication, a user of cell phone 210 may reorder a SIP Registrar to provide that the order of attempts to establish a communication link with the user follow the changed order in the SIP Registrar. Application server 220 may communicate using message 250 with S-CSCF 230 to effect the ordering in the SIP Registrar. After application server 220 has made the changes in the SIP Registrar in S-CSCF 230 indicated by the commands from cell phone 210 (or another internet-enabled device) in communication 240, future sessions destined for the PUID whose registrations had been changed would follow the new rules. In particular, S-CSCF 230 will attempt to contact a user associated with a PUID using the order of devices in the SIP Registrar in S-CSCF 230, as edited by the user.

Figure 3:
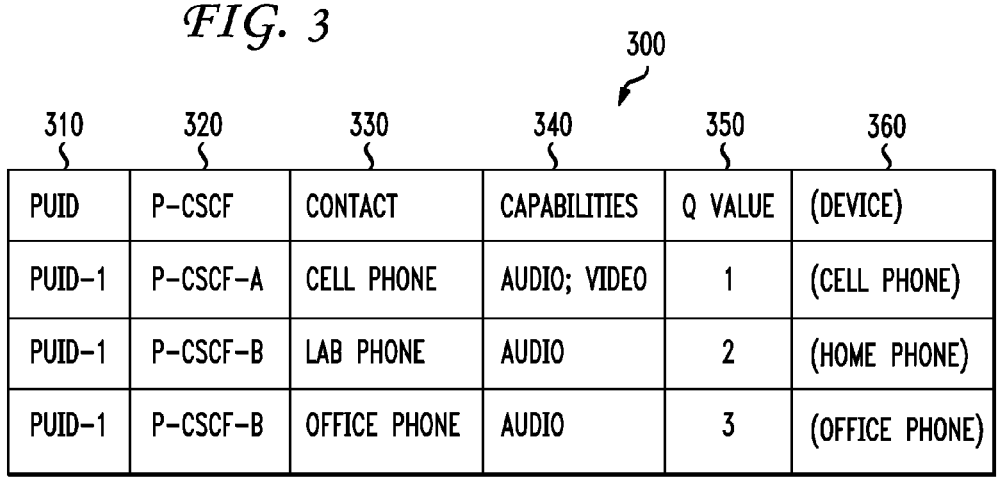
FIG. 3 illustrates a table representing information in a SIP Registrar.

FIG. 3 illustrates table 300 representing information in a SIP Registrar. The information included in table 300 may also be referred to herein as records. Table 300 depicts a SIP Registrar before changes are made. Without the invention, changes would have to be made from each individual device, for instance the cell phone or office phone, in order to make these changes. Table 300 includes column 310 identifying the PUID. All of the PUID's in column 310 are for the same PUID, in this case, PUID-1. In this manner, a person attempting to contact a user may direct their attempt to establish a communication link to one PUID, and table 300 representing a SIP Registrar will follow the order therein to establish the communication link. Table 300 also includes column 320 including P-CSCF indicating the proxy call session control session for the particular row element. Table 300 also includes column 330, which indicates a contact name, for instance cell phone, lab phone or office phone. Table 300 includes column 340, which indicates capabilities for the particular device in each row. For instance, the cell phone and the first row of table 300 has both audio and video capabilities, whereas the lab phone and office phone in rows 2 and 3, respectively, have only audio capabilities. In this manner, an attempt to make a video conference call may be directed to only the devices having video capabilities. Table 300 also includes column 350, which includes a q value. The q value indicates the order of attempts for contacting the user. Table 300 also includes column 360 which indicates the device. For instance, a person attempting to contact PUID-1 would cause the S-CSCF to attempt to contact the office phone first, as illustrated by the higher q value of 3 in column 350. If the office phone was not answered, the S-CSCF would attempt to contact the lab phone since it has the next highest q value of 2 as shown in column 350. If the lab phone was not answered, the S-CSCF would attempt to contact the cell phone due it having the next highest q value of 1 as shown in column 350.

Figure 4:
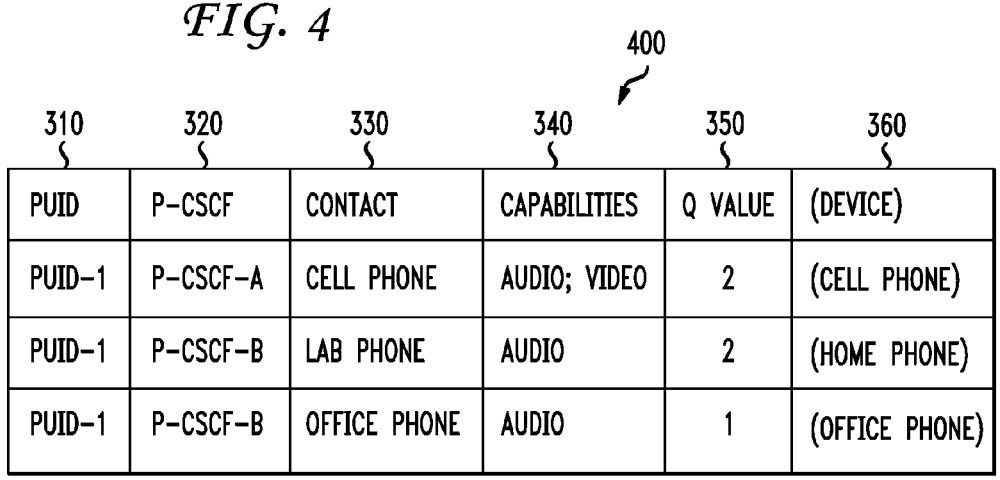
FIG. 4 illustrates the table of FIG. 3 after changes are made.

The user could use one application server, accessible from any device, to make changes to the order in which sessions were attempted. FIG. 4 illustrates the SIP Registrar table of FIG. 3 after changes are made to make table 400. All of the columns in table 400 are the same identities as the columns in table 300. However, the q values for the different rows have been changed. In particular, column 350, representing the q values, has been changed. In table 300, column 350 has value 1 in row 1, value 2 in row 2, and value 3 in row 3. In contrast, column 350 in table 400 has value 2 in row 1, value 2 in row 2, and value 1 in row 3. A person attempting to contact the PUID-1 illustrated in table 400 would cause the S-CSCF to initially attempt to contact the cell phone and lab phone simultaneously due to the higher, identical q value of 2 in column 350. If no connection is established with either the cell phone or the lab phone, an attempt to establish a communication link with the office phone would occur due to it having the next lower q value of 1, as shown in column 350 of table 400 of FIG. 4.

Figure 5:
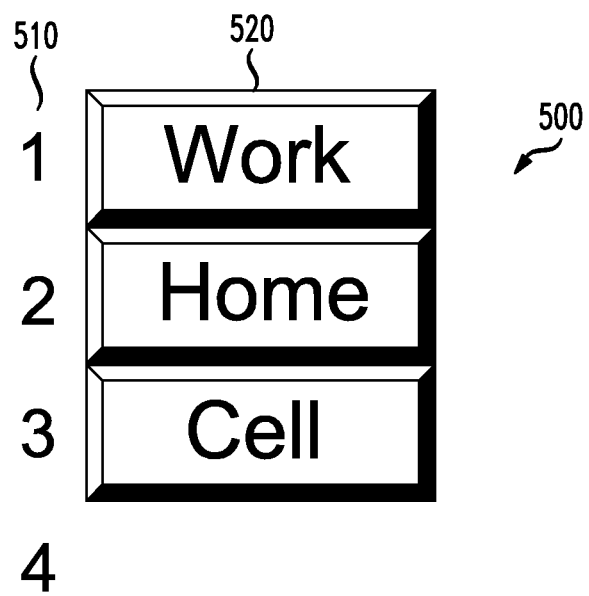
FIG. 5 illustrates an exemplary user interface.

FIG. 5 illustrates an exemplary user interface. User interface 500 includes column 510 indicating an order of attempts and column 520 indicates a device corresponding to each order of attempt. In particular, user interface 500 may be accessed by a communication device or any other web portal. A user may adjust the elements of column 520 to change the order in which attempts are made. User interface 500 indicates that the work phone would be attempted first, then the phone home next, and then the cell phone last.

Figure 6:
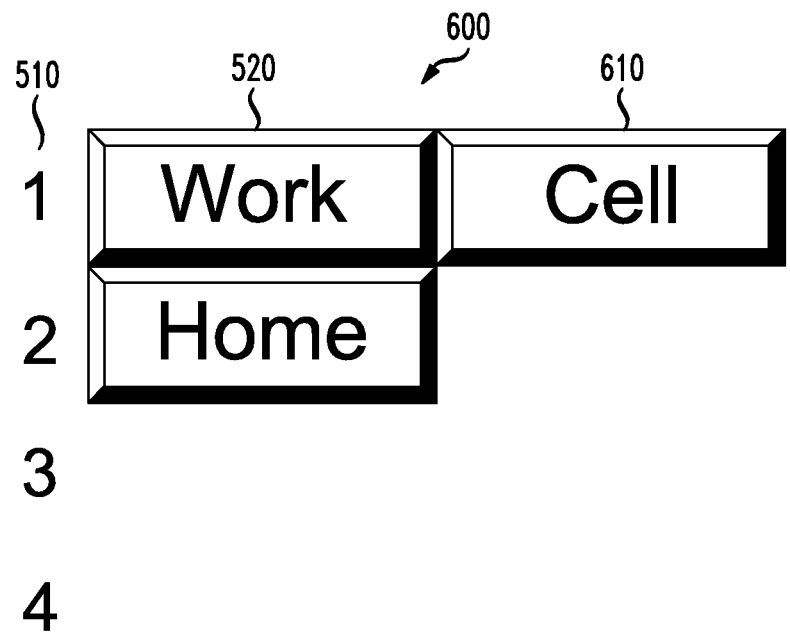
FIG. 6 illustrates the exemplary user interface of FIG. 5 after changes are made.

FIG. 6 illustrates the exemplary user interface of FIG. 5 after changes are made. After accessing a web portal via a computer, a netbook, a smart phone, a PDA, or any other appropriate device, a user accessing user interface 500 may transform the information contained therein to that shown in user interface 600 of FIG. 6. User interface 600 includes column 510 indicating an order of attempts and column 520 indicating a first device corresponding to the attempt order. Additionally, user interface 600 includes column 610 indicating a second device corresponding to the attempt order. Column 610 indicates a second device, which is attempted at the same time as the device shown in column 520 for the same row number of column 510. In particular, cell phone may be attempted at the same time as the home phone on the first attempt by a person to contact a PUID. If neither the home phone nor the cell phone are answered, the S-CSCF will attempt to contact the work number, as shown in row 2 of column 520. In summary, a user who has interfaced with user interface 500 in FIG. 5 to create the user interface shown in FIG. 6 has reordered the elements to put the home and cell phone in the first position to be simultaneously attempted, and put the work phone as the next device to attempt contact.

An exemplary embodiment allows editing of the registrations in an S-CSCF from an application server. New registrations from the device would not be necessary, and the changes could be made based on service logic or based on user input over a user interface. The process may be: 1) the user would request from an application server the current registration order; 2) the application server would authenticate the user using whatever means are available—the user may be coming from any of the three devices or from a different one; 3) the application server may track the user's registrations using third party registrations or by subscribing to a REG event, and the application server may then return the current registration order to the user; 4) the user would view the current order and make desired changes; 5) the changes would be communicated to the application server; 6) the application server would make changes to the q values in the SIP Registrar of the S-CSCF; and 7) the S-CSCF would confirm with the application server and the user agents affected that the changes had been made. Not all of these steps may be necessary.

Figure 7:
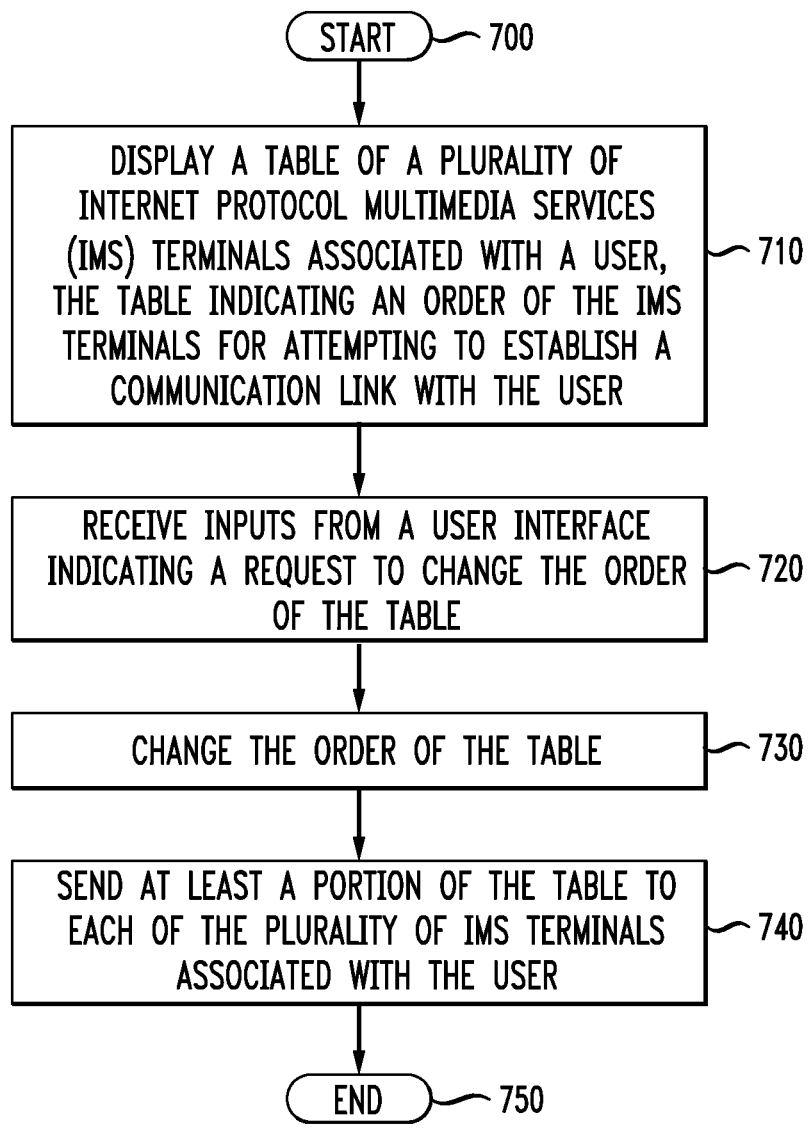
FIG. 7 illustrates a method according to an exemplary embodiment.

FIG. 7 illustrates a method according to an exemplary embodiment. The method of FIG. 7 starts at start circle 700, and proceeds to operation 710, which indicates to display a table of a plurality of internet protocol multimedia services terminals associated with the user. The table indicates an order of the IMS terminals for attempting to establish a communication link with the user. From operation 710, the flow proceeds to operation 720, which indicates to receive inputs from a user interface indicating a request to change the order of the table. From operation 720, the flow proceeds to operation 730, which indicates to change the order of the table. The table may be on a different network element, the S-CSCF, from the application server that receives the inputs from the user. From operation 730, the flow proceeds to operation 740, which indicates to send at least a portion of the table to each of the plurality of IMS terminals associated with the user. From operation 740, the flow proceeds to end circle 750.

The method may also include sending at least a portion of the records to each of the plurality of IMS terminals associated with the user. The terminals may preferably know that their own registration has changed. The actual changes take place in the SIP Registrar of the S-CSCF. At least one of the records may indicate a media capability of at least one of the plurality of IMS terminals associated with the user. The method may include authenticating the user by determining that the request is received from one of the plurality of IMS terminals associated with the user. The method may include authenticating the user by tracking a user registration using a third party registration and subscribing by the application server to a REG event. The plurality of records include a SIP registrar and each record includes a q value for a respective one of the IMS terminals associated with the user, the q value indicating the order.

Figure 8:
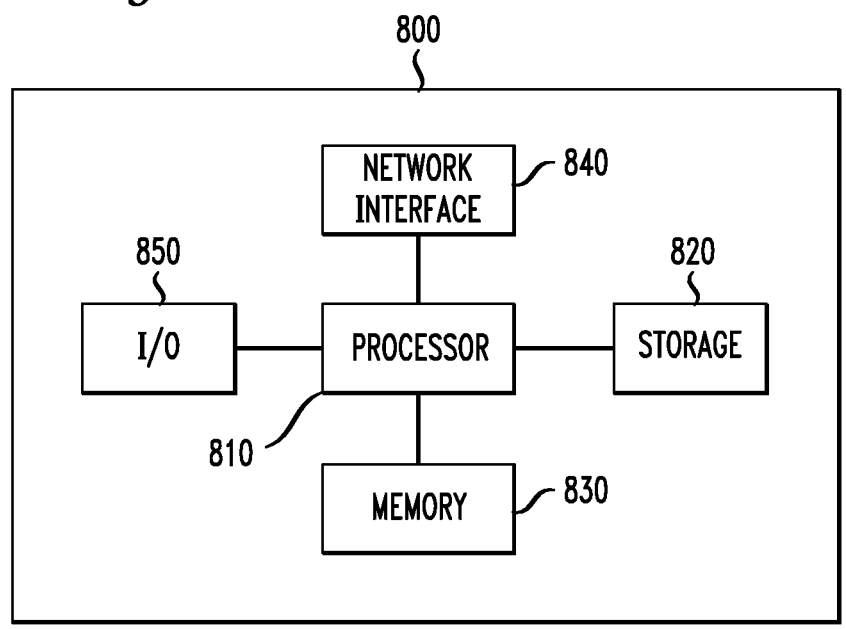
FIG. 8 illustrates a computer system according to an exemplary embodiment.

FIG. 8 is a high level block diagram of a computer in accordance with an embodiment of the present invention. Computer 800 can, for example, operate as elements 110, 120 or 130 of FIG. 1 or elements 210, 220 or 230 of FIG. 2. Additionally, computer 800 can perform the steps described above (e.g., with respect to FIG. 7). Computer 800 contains processor 810 which controls the operation of computer 800 by executing computer program instructions which define such operation, and which may be stored on a computer-readable recording medium. The computer program instructions may be stored in storage 820 (e.g., a magnetic disk, a database) and loaded into memory 830 when execution of the computer program instructions is desired. Thus, the computer operation will be defined by computer program instructions stored in memory 830 and/or storage 820 and computer 800 will be controlled by processor 810 executing the computer program instructions. Computer 800 also includes one or more network interfaces 840 for communicating with other devices, for example other computers, servers, or websites. Network interface 840 may, for example, be a local network, a wireless network, an intranet, or the Internet. Computer 800 also includes input/output 850, which represents devices which allow for user interaction with the computer 800 (e.g., display, keyboard, mouse, speakers, buttons, webcams, etc.). One skilled in the art will recognize that an implementation of an actual computer will contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for operation of a serving call session control function server, comprising:

storing a plurality of records, each record corresponding to a respective one of a plurality of internet protocol multimedia services terminals associated with a user, the plurality of records indicating an order of the internet protocol multimedia services terminals for attempting to establish a communication link with the user, each record indicating a media capability describing a type of media communication a corresponding internet protocol multimedia services terminal can receive;

authenticating the user by tracking a user registration using a third party registration and subscribing by the application server to a registration event;

receiving an input from an application server indicating a first request from the user to change a first type of media capability of a particular record in the plurality of records to a second type of media capability and a second request from the user to create a different order for attempting to establish the communication link;

changing the particular record according to the first request, the particular record changed to indicate the second type of media capability that describes a first type of media communication; and excluding an internet protocol multimedia services terminal that corresponds with the particular record from attempts to establish a communication link, according to the different order, for a second type of media communication different than the first type of media communication.

2. The method of claim 1, further comprising sending at least a portion of the records to each of the plurality of internet protocol multimedia services terminals associated with the user.

3. The method of claim 1, further comprising authenticating the user by determining that the first request and the second request are received from one of the plurality of internet protocol multimedia services terminals associated with the user.

4. The method of claim 1, wherein the plurality of records include a session initiation protocol registrar and each record includes a q value for a respective one of the internet protocol multimedia services terminals associated with the user, the q value indicating the order.

5. An apparatus comprising:

a memory storing computer program instructions and a plurality of records, each record corresponding to a respective one of a plurality of internet protocol multimedia services terminals associated with a user, the plurality of records indicating an order of the internet protocol multimedia services terminals for attempting to establish a communication link with the user, each record indicating a media capability describing a type of media communication a corresponding internet protocol multimedia services terminal can receive;

a processor communicatively coupled to the memory, the processor configured to execute the computer program instructions, which, when executed on the processor, cause the processor to perform operations comprising:

authenticating the user by tracking a user registration using a third party registration and subscribing by the application server to a registration event;

receiving an input from an application server indicating a first request from the user to change a first type of media capability of a particular record in the plurality of records to a second type of media capability and a second request from the user to create a different order for attempting to establish the communication link;

changing the particular record according to the first request, the particular record changed to indicate the second type of media capability that describes a first type of media communication; and excluding an internet protocol multimedia services terminal that corresponds with the particular record from attempts to establish a communication link, according to the different order, for a second type of media communication different than the first type of media communication.

6. The apparatus of claim 5, the operations further comprising: sending at least a portion of the records to each of the plurality of internet protocol multimedia services terminals associated with the user.

7. The apparatus of claim 5, the operations further comprising: authenticating the user by determining that the first request and the second request are received from one of the plurality of internet protocol multimedia services terminals associated with the user.

8. The apparatus of claim 5, wherein the plurality of records include a session initiation protocol registrar and each record includes a q value for a respective one of the internet protocol multimedia services terminals associated with the user, the q value indicating the order.

9. A non-transitory computer readable medium storing computer program instructions for operation of a serving call session control function server, which, when executed on a processor, cause the processor to perform operations comprising:

storing a plurality of records, each record corresponding to a respective one of a plurality of internet protocol multimedia services terminals associated with a user, the plurality of records indicating an order of the internet protocol multimedia services terminals for attempting to establish a communication link with the user, each record indicating a media capability describing a type of media communication a corresponding internet protocol multimedia services terminal can receive;

authenticating the user by tracking a user registration using a third party registration and subscribing by the application server to a registration event;

receiving an input from an application server indicating a first request from the user to change a first type of media capability of a particular record in the plurality of records to a second type of media capability and a second request from the user to create a different order for attempting to establish the communication link;

changing the particular record according to the first request, the particular record changed to indicate the second type of media capability that describes a first type of media communication; and excluding an internet protocol multimedia services terminal that corresponds with the particular record from attempts to establish a communication link, according to the different order, for a second type of media communication different than the first type of media communication.

10. The non-transitory computer readable medium of claim 9, the operations further comprising sending at least a portion of the records to each of the plurality of internet protocol multimedia services terminals associated with the user.

11. The non-transitory computer readable medium of claim 9, the operations further comprising: authenticating the user by determining that the first request and the second request are received from one of the plurality of internet protocol multimedia services terminals associated with the user.

12. The non-transitory computer readable medium of claim 9, wherein the plurality of records include a session initiation protocol registrar and each record includes a q value for a respective one of the internet protocol multimedia services terminals associated with the user, the q value indicating the order.

* * * * *